US009144736B2

(12) United States Patent
Kotani

(10) Patent No.: US 9,144,736 B2
(45) Date of Patent: Sep. 29, 2015

(54) GAME WHICH RECOGNIZES COMMANDS BY THE TYPE AND RHYTHM OF OPERATION INPUT

(75) Inventor: Hiroyuki Kotani, Kanagawa (JP)

(73) Assignees: SONY CORPORATION, Tokyo (JP); SONY COMPUTER ENTERTAINMENT INC., Tokyo (JP)

(*) Notice: Subject to any disclaimer, the term of this patent is extended or adjusted under 35 U.S.C. 154(b) by 1433 days.

(21) Appl. No.: 12/167,523

(22) Filed: Jul. 3, 2008

(65) Prior Publication Data

US 2009/0036210 A1 Feb. 5, 2009

(30) Foreign Application Priority Data

Jul. 6, 2007 (JP) .................................. 2007-178815

(51) Int. Cl.
*A63F 13/00* (2014.01)
*A63F 13/40* (2014.01)

(52) U.S. Cl.
CPC ......... *A63F 13/10* (2013.01); *A63F 2300/6045* (2013.01); *A63F 2300/6081* (2013.01); *A63F 2300/8047* (2013.01)

(58) Field of Classification Search
CPC .............................. A63F 2300/10; A63F 13/10
USPC .......................................................... 463/36
See application file for complete search history.

(56) References Cited

U.S. PATENT DOCUMENTS

2002/0025842 A1* 2/2002 Nobe et al. ..................... 463/7
2005/0014543 A1* 1/2005 Itoi et al. ........................ 463/8

FOREIGN PATENT DOCUMENTS

| JP | 09-239151 | 9/1997 |
|----|-----------|--------|
| JP | 2001-321564 | 11/2001 |
| JP | 2007 68823 | 3/2007 |

OTHER PUBLICATIONS

Magnacarta Battle System: How to Understand the Display, Nov. 26 Issue of Special Edition of Weekly Famitsu, Enterbrain, Inc., Nov. 26, 2004, vol. 19, Issue 48, No. 832, p. 88.

* cited by examiner

*Primary Examiner* — Kang Hu
*Assistant Examiner* — Thomas H Henry
(74) *Attorney, Agent, or Firm* — Frommer Lawrence & Haug LLP; William S. Frommer

(57) ABSTRACT

A game control technique with high entertainment value is provided. In a game device, a confirmation sound output unit assigns a sound to each type of an operation input from a player; and upon the reception of the operation input from the player, the confirmation sound output unit outputs the sound assigned to the operation input. A command memory unit stores a plurality of types and patterns of the rhythms of the operation input in association with commands which is issued upon the reception of the operation inputs. A command determination unit acquires the type and rhythm of the operation input from the player and determines whether the type and rhythm of the operation input match the pattern stored in the command memory unit. A repetition unit outputs the sound corresponding to the pattern when the operation input from the player is determined to match the pattern stored in the command determination unit. A game control unit issues the command determined by the command determination unit and advances the game.

9 Claims, 7 Drawing Sheets

Fig.3

| BUTTON | SOUND |
|--------|-------|
| ○ | PON |
| □ | PATA |
| △ | CHAKA |
| × | DON |

Fig.4

| OPERATION PATTERN | FLAG | COMMAND |
|---|---|---|
| PON · DON · PON · PON | 1 | ADVANCE |
| PATA PATA PON · CHAKA CHAKA DON | 0 | ATTACK |
| .. | .. | .. |
| DON · DON DON DON DON | 0 | THUNDER |
| .. | .. | .. |

60

GAME WHICH RECOGNIZES COMMANDS BY THE TYPE AND RHYTHM OF OPERATION INPUT

BACKGROUND OF THE INVENTION

1. Field of the Invention

The present invention relates to game control techniques, and particularly to game devices for controlling games which recognize commands by a plurality of types and rhythms of operation inputs, game control methods, and game control programs.

2. Description of the Related Art

In simulation games, interfaces are commonly used in which menu screens for inputting commands are displayed and the commands to be inputted are selected when players manipulate, for example, characters.

During the display of a menu screen, the progress of a game often times needs to be interrupted temporarily. Although some games can progress during the display of the menu screens, the players are temporarily required to keep close watch on the menu screens and are detached from the game world every time the players input commands. Thus, the ethos of the game can be disturbed.

SUMMARY OF THE INVENTION

In this background, a general purpose of the present invention is to provide game control techniques with high entertainment value.

An aspect of the present invention relates to a game control program. The game control program product allows the computer to have functions which comprises: a function to output an indication sound or an indication image to be the indication for a player to time an operation input, a function to acquire the type and rhythm of the operation input from the player; a function to determine whether the acquired type and rhythm of the operation input from the player match the pattern stored in a command memory unit by referring to the command memory unit in which a plurality of patterns of type and rhythm of operation inputs are stored in association with commands issued upon the reception of the operation inputs having the patterns; a function to synchronize at least one of a sound and an image in response to the operation input with the indication sound or the indication image and output the sound or the image when the operation input from the player is determined to match the pattern; and a function to issue a command corresponding to the pattern when the operation input from the player is determined to match the pattern.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 is a diagram showing the sounds assigned to each button;

FIG. 4 is a diagram showing an example of internal data in a command memory unit;

DETAILED DESCRIPTION OF THE INVENTION

The invention will now be described by reference to the preferred embodiments. This does not intend to limit the scope of the present invention, but to exemplify the invention.

The game device according to the embodiment provides a user interface in which commands are inputted by operating, in predetermined rhythm, buttons to which predetermined sounds or displays are assigned. For example, in a real time simulation game, instead of being inputted through a menu screen, the commands for giving instructions to characters and generating events are inputted by operating the buttons in predetermined rhythm. The player inputs commands by performing the operation in predetermined pattern in rhythm to the background music or to the display, and advances the game. Such a technique can provide an innovative game which has both elements of music game and simulation game.

A description is now be given, as an example in the embodiment, of a simulation game in which a group of a plurality of characters obtain items, attack and beat monsters, and save companions in order to proceed in the adventure. The player gives instructions to the characters in rhythm to drumbeats, for example, to advance, attack, or escape, by operating the buttons to which the sound of drumbeats are assigned. Since the commands can be inputted without any menu screens involved, the game can progress smoothly without getting interrupted for the command input.

Figure 1:
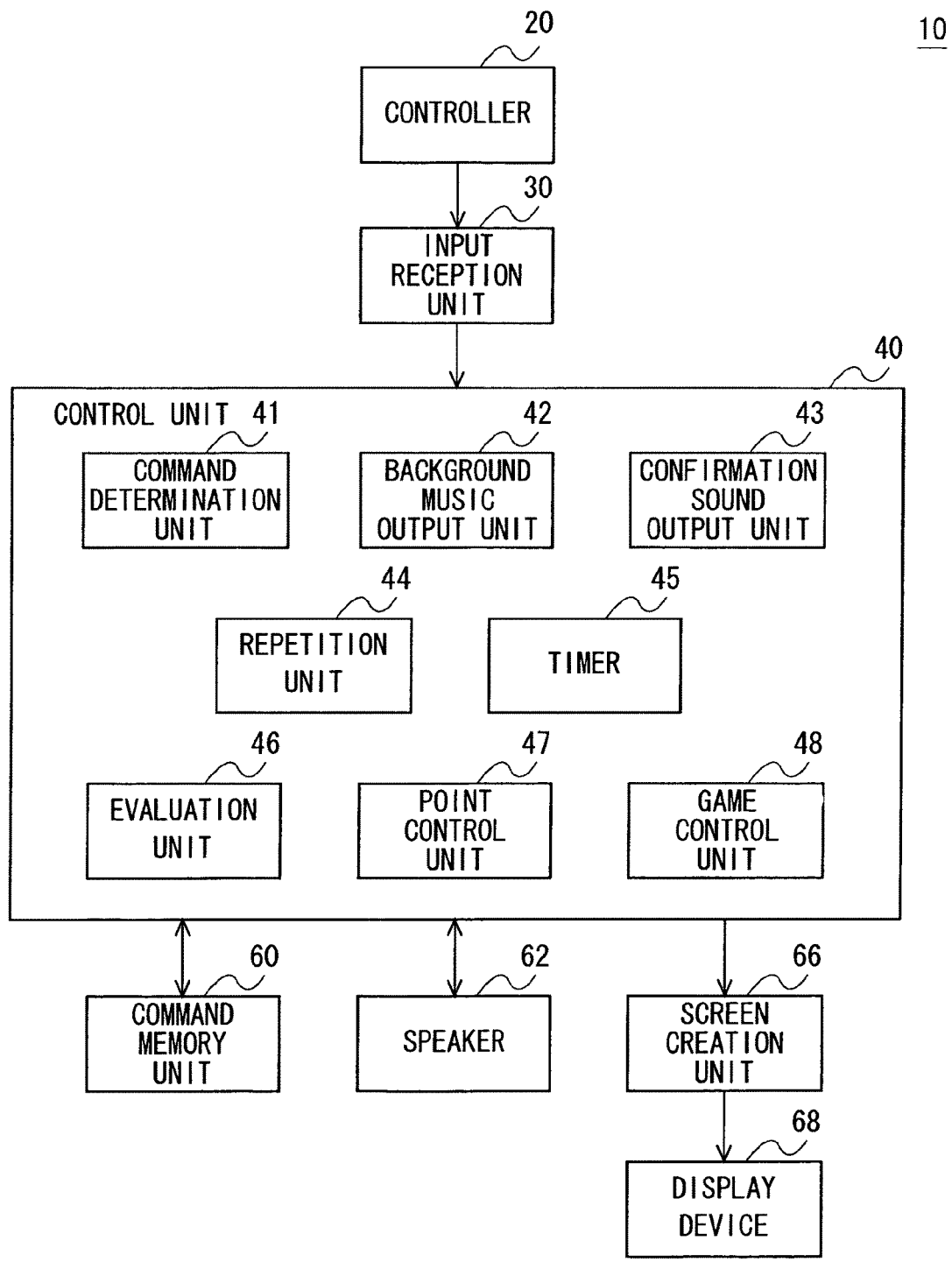
FIG. 1 is a diagram showing the configuration of a game device according to the embodiment.

FIG. 1 shows the configuration of a game device 10 according to the embodiment. The game device 10 is provided with a controller 20, an input reception unit 30, a control unit 40, a command memory unit 60, a speaker 62, a screen creation unit 66, and a display device 68. These configurations are implemented in hardware component by any CPU of a computer, a memory or a program loaded into the memory. Functional blocks are implemented by the cooperation of hardware components. Therefore, it will be obvious to those skilled in the art that the functional blocks may be implemented in a variety of manners by a combination of hardware and software.

The input reception unit 30 receives a control signal which is inputted from the controller 20 the player operates. The control unit 40 executes a game program based on the instruction from the user which is received in the input reception unit 30, and advances the simulation game. The command memory unit 60 retains the pattern of the button operation received as a command. The speaker 62 outputs the game audio controlled by the control unit 40. The screen creation unit 66 creates a screen for the game which is controlled by the control unit 40, and allows the display device 68 to display the screen.

Figure 2:
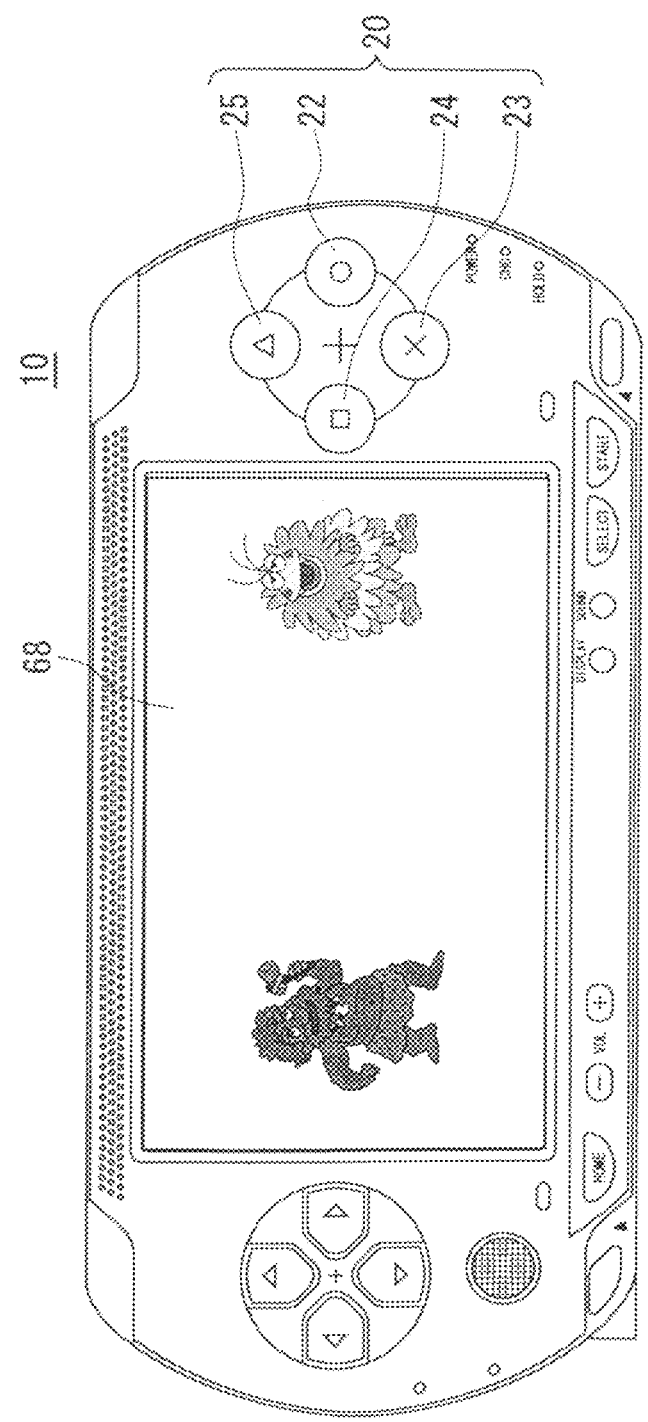
FIG. 2 is a diagram showing the exterior view of a game device.

FIG. 2 shows the exterior view of the game device 10. The display device 68 and the controller 20 are provided on the front surface of the game device 10. The controller 20 includes four types of buttons 22, 23, 24, and 25. The four different buttons 22-25 are marked with predetermined figures in order to distinguish one button from another. More specifically, a ○ button 22 is marked with a circle, a x button 23 with a cross, a □ button 24 with a square, and a Δ button 25 with a triangle.

Figure 3:
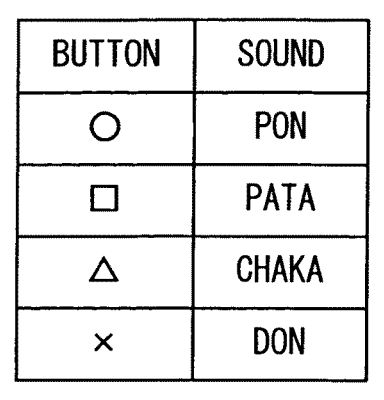

In the embodiment, the sound of drumbeats is assigned to each button, and the command can be inputted with the combination of the sounds. FIG. 3 shows the sounds assigned to each button. The sound "pon" is assigned to the ○ button 22, the sound "pata" to the □ button 24, the sound "chaka" to the Δ button 25, and the sound "don" to the x button 23. As described above, since the sound is assigned to each button, the player can easily learn the details of the operation required for issuing commands. For example, it is easier for the player to remember the operation with the sounds "don pon don don" than to remember the operation "x+○+x+x+", and the operation with the sounds can be easily linked to the movement. Thus, the highly operable user interface can be provided by employing such a technique.

Referring back to FIG. 1, each configuration is further explained. The command memory unit 60 stores the type and pattern of the rhythm of the button operation received as a command, in association with the command issued upon the reception of operation input. FIG. 4 shows an example of internal data in a command memory unit 60. The command memory unit 60 is provided with an operation pattern column 202, a flag column 204, and a command column 206. The operation pattern column 202 stores the type and pattern of the rhythm of the button operation. The flag column 204 stores a flag indicating whether the command can be used. The command column 206 stores the command which is issued. For example, when the player performs the button operation "x+○+x+x+", the sound "don+pon+don+don+" is output and the command "advance" is issued.

A background music output unit 42 is an example of a first output unit, and outputs the background music in the predetermined rhythm as an indication sound in order to time the button operation when the player inputs the command. The background music output unit 42 may output audio, for example, the sound of drumbeats, in a predetermined pace or output music in a predetermined pace. The background music output unit 42 may output the background music constantly during the game, or output the background music when the player inputs the command. In the latter case, the background music output unit 42 may output the background music during the time frame required for inputting the operation pattern retained in the command memory unit 60, starting from the moment when the player operates the button. In the former case, the timing to output the background music may be changed so that the moment the player operates the button is counted as the first beat. With this, even when the player cannot start the operation in synchronization with the background music, the command input can still be assisted. Instead of the background music output unit 42, an indication image output unit may be provided which outputs an indication image to be the indication for timing the output.

A command determination unit 41 acquires the type of the button the player inputs and the timing at which the player inputs the button, and determines the command inputted by the player by comparing the type of button and the timing with the operation pattern retained in the command memory unit 60. The command determination unit 41 may acquire the type and rhythm of the button inputs entered within the time frame required for inputting the operation pattern retained in the command memory unit 60 and determine the command by comparing with the pattern retained in the command memory unit 60. Or the command determination unit 41 may determine the command by comparing the type and rhythm of the button input with the pattern retained in the command memory unit 60 every time the player operates the button. In the latter case, when the button operation performed by the player does not match any operation patterns retained in the command memory unit 60, or when the button is operated outside the predetermined time displacement, the player may be notified of the failure in inputting the command at that point even the player is in middle of inputting the command, and the reception of the command may be discontinued. The command determination unit 41 notifies the game control unit 48 of the corresponding command when the type and rhythm of the button input from the player match the operation pattern stored in the command memory unit 60.

A confirmation sound output unit 43 outputs the sound assigned to the button the player inputs. For example, the confirmation sound output unit 43 outputs the sound "pon" assigned to the ○ button 22 when the player presses ○ button 22. A confirmation sound output unit 43 may output the sound assigned to the button the player presses, regardless of the timing the player presses the button. The confirmation sound output unit 43 may indicate that the input is inappropriate and cannot be accepted as a command when the timing at which the player presses the button does not match any operation patterns retained in the command memory unit 60 or when the timing is outside the predetermined time displacement range. The confirmation sound output unit 43 may change the sound to be output in accordance with the accuracy of the operation of the player. For example, when the time displacement is small, a big sound with a bright tone may be output, and when the time displacement is large, a small untuned sound may be output. With this, the player can easily learn aurally the accuracy of the timing of the operation.

A repetition unit 44 is an example of a second output unit, and in order to show the player the received command for confirmation when the command determination unit 41 receives the command, the repetition unit 44 synchronizes the sound, which is assigned to each operation input included in the received command pattern, with the background music in the patterned rhythm and outputs the sound. In this case, a character displayed on the game screen may output the sound corresponding to the command as an utterance of the character in the way the instruction is repeated, in response to the command input from the player. With this, the player can easily learn aurally whether the intended command is received. The repetition unit 44 may change the sound in accordance with the accuracy of the operation of the player. For example, when the time displacement is small, a big sound with a bright tone may be output, and when the time displacement is large, a small sound with a dark tone may be output. Also, as will hereinafter be described in detail, the sound to be output may be changed in accordance with the number of the successful command inputs in succession from the player. For example, when the number of the successful command inputs in succession increases, the sound of a lot of characters lively repeating the command may be output by adding a repeating sound or adding a sound effect synchronized with the repeating sound. Also, not only the same sound having the pattern the player inputs is repeated, but also the sound may be developed by changing the rhythm of the repeating sound or by modulating the melody and may be outputted. As a result, the entertainment value of the game can be increased.

The repetition unit 44 repeats the command to the beat of the background music after the operation input from the player. The command determination unit 41 receives the next command input subsequently after the repetition by the repetition unit 44. For example, when a command of a four-beat rhythm is made available and the player inputs the command of a four-beat rhythm, the command determination unit 41 determines the command and notifies a game control unit 48 of the command. While the repetition unit 44 repeats the command of a four-beat rhythm in response to the command input from the user, the game control unit 48 executes the command given from the command determination unit 41 and advances the game. The player can visually confirm the progress of the game made by the command, confirming aurally the command he/she has inputted while the command is being repeated. In accordance with the state of the game advanced by the command, the command to be inputted next is determined. Then, the repetition by the repetition unit 44 is followed by the operation of the button in accordance with the pattern for inputting the next command to the beat of the background music. As described above, the acquisition of the operation input from the player and the output of the sound or the image assigned to the operation input included in the pattern can be repeated alternately in the game in the embodiment. The rhythmical game progress filled with musical elements can be achieved by making such an interaction continuously ongoing.

When the command determination unit 41 receives a command, the repetition unit 44 may synchronize the sound or phrase, which are preliminarily associated with the pattern of the received command, with the background music and output the sound or the phrase. When not the sound but the image or the oscillating motion of the controller 20 is assigned to each button, an output unit, instead of the confirmation sound output unit 43 and the repetition unit 44, may be provided which outputs the image and oscillating motion assigned to each button.

An evaluation unit 46 evaluates the accuracy of the operation of the player and calculates the points to be given to the player. The evaluation unit 46 acquires a timer value from a timer when the button is inputted, and calculates the time displacement between the input pattern and the operation pattern stored in the command memory unit 60. The evaluation unit 46 calculates, for each of a plurality of operations included in the command, the time displacement between the timing at which the operation input is supposed to be performed and the timing at which the operation input is actually performed, evaluates the accuracy of the operation of the player in accordance with the time displacement, and calculates the points. For example, the total time displacement may be calculated, and higher points may be given to the player with shorter total time displacement. The evaluation unit 46 notifies a point control unit of the evaluation result. As stated previously, when the confirmation sound output unit 43 or the repetition unit 44 changes the sound to be output in accordance with the evaluation result, the confirmation sound output unit 43 or the repetition unit 44 is also notified of the evaluation result.

The evaluation unit 46 further calculates, in addition to the points mentioned above, the points to be given to the player in accordance with the number of the successful command inputs from the player. For example, the higher the number of the successful input of the command in succession becomes, the higher the bonus points which may be given becomes. With this, even the player who is not good at operating the button rhythmically can obtain high points when he/she operates the button within the predetermined time displacement and succeeds in the command input in succession. Therefore, the entertainment value of the game can be improved by appropriately adjusting the difficulty of the game.

The point control unit 47 controls the points given to the player. The point control unit 47 stores the current value of the point in the memory, and adds the points indicated by the evaluation unit 46. The points are reflected in a parameter for controlling the game which progresses in the game control unit 48. For example, the points may be used as the points to be consumed as the game progresses, for example, the energy of the character and magic points, or as a variety of the ability points of the character. For example, the point control unit 47 determines the attack power and the defense skill of the character in accordance with the points given to the player. The player can progress through the game favorably not only by selecting the correct command in accordance with the situation, but also by developing the character by earning the points through the command input in correct rhythm or by succeeding in the command input in succession.

The game control unit 48 advances the game while executing the command indicated by the command determination unit 41.

Figure 5:
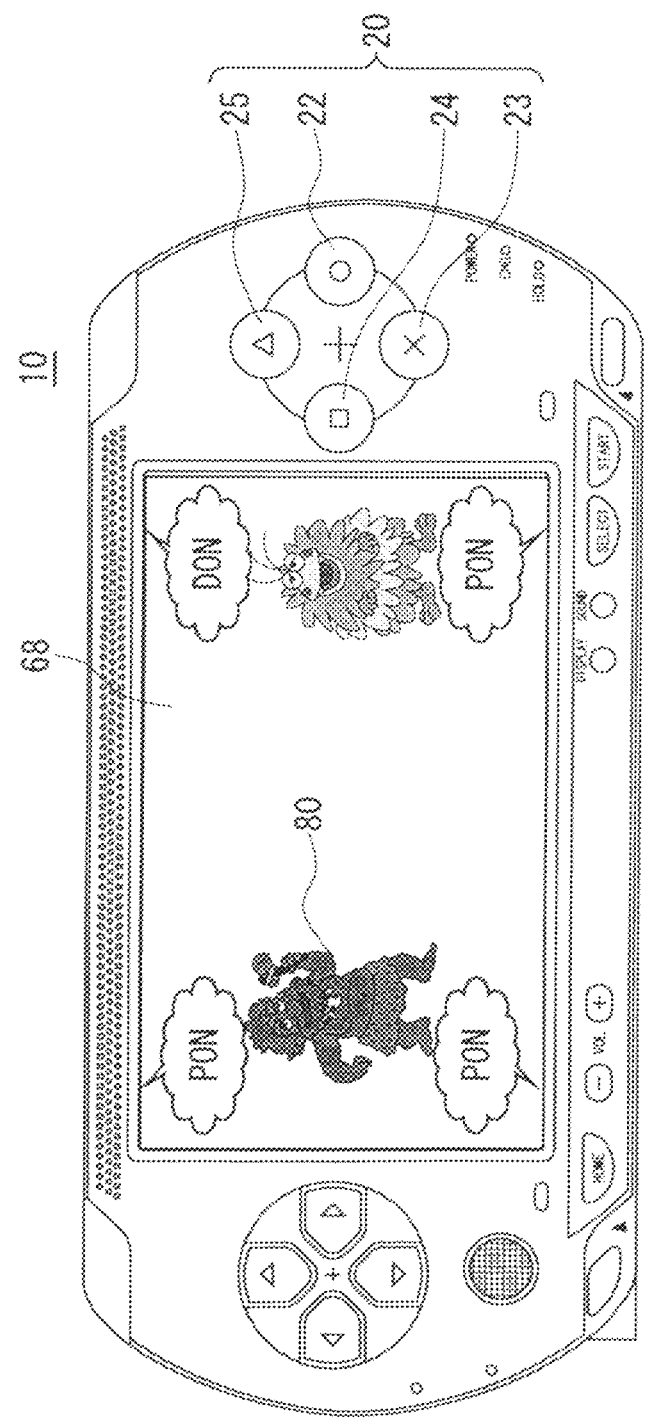
FIG. 5 is a diagram showing an example of a game screen.

FIG. 5 shows an example of a game screen. In the example shown in FIG. 5, the player is inputting the operation, "○+x+○+○+", to the beat of the background music in order to input the command to move a character 80 forward. In this case, the confirmation sound output unit 43 inputs the sound, "pon+don+pon+pon+", which is assigned to the buttons. In the example of FIG. 5, the characters such as "pon" are displayed along with the sound output; however, these characters may not be displayed.

Figure 6:
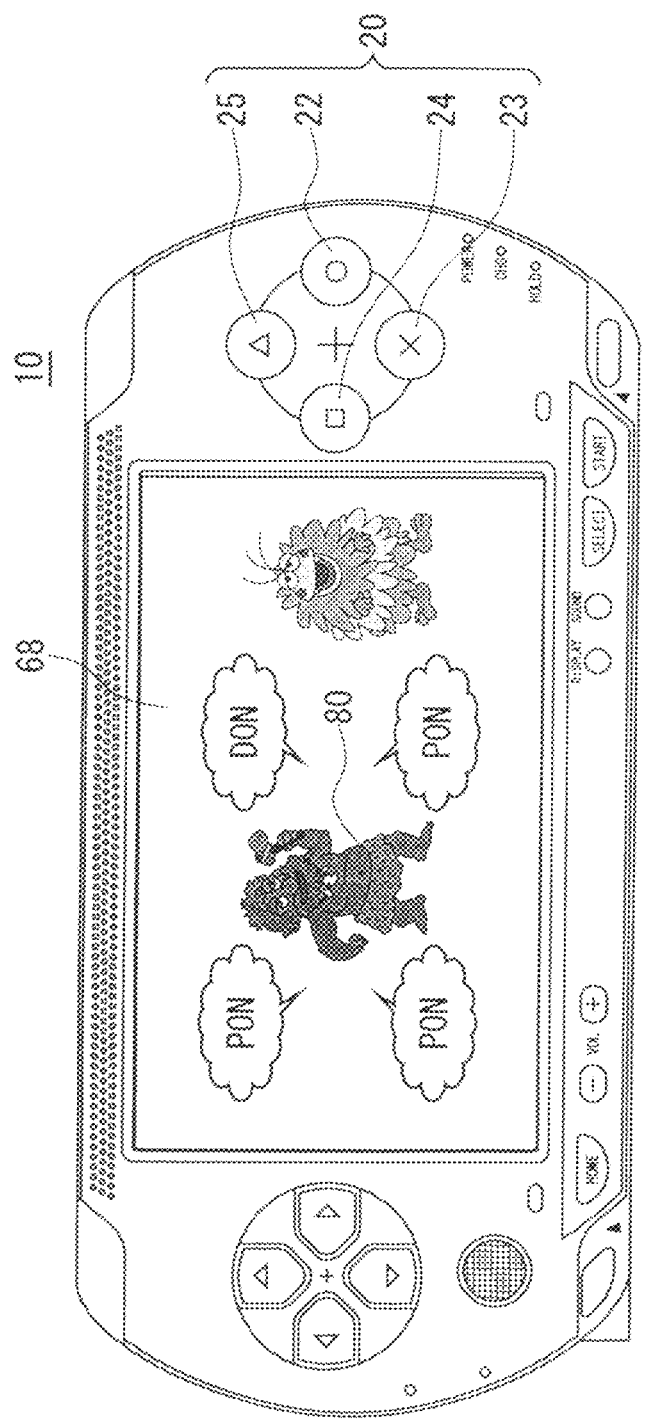
FIG. 6 is a diagram showing an example of a game screen.

FIG. 6 shows an example of a game screen. When the player inputs the operation as shown in the example in FIG. 5, the command determination unit 41 compares the type and timing of the operation input with the operation pattern retained in the command memory unit 60 and determines that the input command is "advance". Then, the repetition unit 44 synchronizes the sound, which is assigned to the respective button input included in the operation pattern of the command, to the background music in the rhythm of the pattern, and outputs the sound, "pon+don+pon+pon+", so that it seems as if the character 80 is uttering the sound. With this, the player can learn that the inputted command is received.

Figure 7:
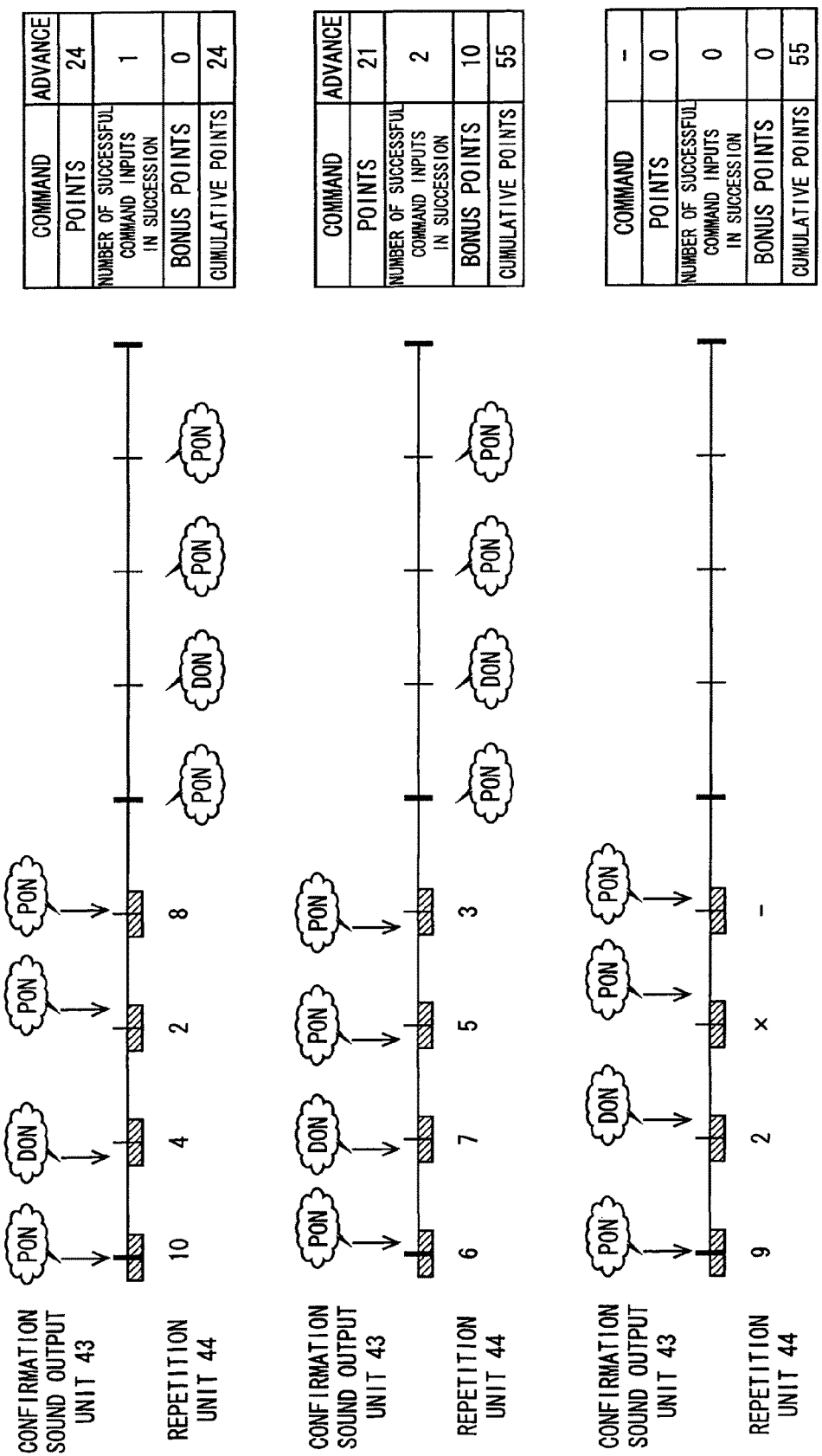
FIG. 7 is a diagram schematically showing the flow of the game progress.

FIG. 7 schematically shows the flow of the game progress. Each stage of FIG. 7 shows the combination of a bar for the player to input the operation and a bar for the repetition unit 44 to repeat. In the top stage in FIG. 7, when the player inputs the operation, "○+x+○+○+", the confirmation sound output unit 43 outputs the sound, "pon+don+pon+pon+". In this case, the evaluation unit 46 evaluates the accuracy of the timing of each operation input. The accuracy of the timing is evaluated in ten levels, and the longer the time displacement becomes, the smaller the evaluation value is given. In FIG. 7, the squares with diagonal strokes show the acceptable ranges of the time displacements for the operation input. Any operation inputs which fall outside of the ranges are determined to be the failed operation inputs. When the output of the background music is started with the first input from the player as a trigger, the time displacement with respect to the first input from the player may be disregarded and the points may not be calculated.

When the command determination unit 41 determines that the inputted command is "advance", the repetition unit 44 repeats the sound which corresponds to the command. The evaluation unit 46 sums up the evaluation values of the operation inputs and calculates the points as "24" points. Also, the evaluation unit 46 increments the counter of the number of successful command inputs in succession to "1" and calculates the bonus points for the counter. In this example, the point, "[(the number of successful input in succession)−1]× 10" is given as the bonus points for the successful command input in succession. Thus, the bonus point is "0" point at this point. The point control unit 47 adds the points indicated by the evaluation unit 46 and the bonus points to the cumulative total points. The game control unit 48 moves the character forward by executing the "advance" command indicated by the command determination unit 41.

Subsequently, in the middle stage in FIG. 7, when the player inputs the operation, "○+×+○+○+", again, the confirmation sound output unit 43 outputs the sound, "pon+don+ pon+pon+". Since all the time displacements with respect to the timings of the operation inputs are within the acceptable range, the command input is determined to be successful and the sound corresponding to the command is repeated by the repetition unit 44. The evaluation unit 46 calculates the points based on the accuracy of the timing for each operation input, increments the counter of the number of successful command inputs in succession to "2", and further gives "10" points as the bonus points. The point control unit 47 calculates the cumulative total points, and the game control unit 48 executes the "advance" command.

Subsequently, in the bottom stage in FIG. 7, the player further intends to input the operation, "○+×+○+○+"; however, since the time displacement with respect to the timing of the operation input for the third beat falls outside of the acceptable range, the command determination unit 41 determines that the command input has failed. In this case, the repetition unit 44 does not repeat the sound, and the points are not given. The evaluation unit 46 resets the counter for the number of successful command inputs in succession to "0".

In pursuit of the improvement in the entertainment value, efforts tend to be directed to building elaborate game worlds in the conventional simulation games, and the settings often become complicated resulting in the complication in operations and the difficulty in beating the games. However, in the embodiment, the entertainment value can be improved in such a new perspective that musical elements are added to a simulation game and the game progresses rhythmically.

Also, the whole new forms of entertainment can be brought to the players who prefer music games, since different from the conventional music games where the accuracy in predetermined operations to the beat of the music is pursued, it is required to select commands according to the situations and perform the operations accurately in rhythm in order to issue the commands. In the conventional music games, once the players beat the games, often times the games cannot be enjoyed in any ways other than beating the games with higher points. However, in the embodiment, since the operations are performed in rhythm in accordance with the situations of the simulation games which change every time the player plays, the game which can be played repeatedly without the players getting bored can be provided.

It has been suggested that one command is associated to one operation pattern. However, for example, the meaning may be given independently to the type and rhythm of the operation, and a command may be issued with respect to the combination of the type and the rhythm of the operation. For example, the meaning "advance" may be associated with a certain operation type, and the meanings such as "quickly" and "slowly" with certain rhythms; and even when the combination of the same button types is input, the commands "advance quickly" and "advance slowly" may be distinguished in response to the rhythm.

Described above is an explanation based on the embodiment of the present invention. The embodiment is intended to be illustrative only and it will be obvious to those skilled in the art that various modifications to constituting elements and processes could be developed and that such modifications are also within the scope of the present invention.

What is claimed is:

1. A tangible non-transitory, computer-readable recording medium with a game control program product embedded thereon, the game control program product operating in conjunction with a game control system, said system comprising:
an input device for acquiring operation input,
a speaker or a display for outputting a continuous rhythm by means of an indication sound or an indication image to the speaker or the display, respectively, to be an indication for a player to time operation input,
a control processor for acquiring, during a first time frame in which the operation input from the player can be accepted, an input type and an input rhythm of a series of operation input received from the input device for inputting a command selected by the player from among a plurality of commands for controlling a character operated by the player from the player,
wherein the control processor sends a control signal to the speaker or the display to output a sound or an image respectively assigned to the input type of the operation input acquired from the player during the first time frame,
wherein the control processor refers to a memory in which a plurality of patterns of type and rhythm of operation input are stored in association with the plurality of commands respectively, and determines whether the series of operation input from the input device entered during the first time frame matches a pattern stored in the memory, when the acquired input type and input rhythm of the series of operation input matches, respectively, a type and a rhythm of the pattern,
wherein the control processor repeats, if the series of operation input from the input device matches a pattern stored in the memory, outputting the sound or the image of the pattern, during a second time frame, after the first time frame, in which the operation input from the input device is not accepted, to the speaker or the display in a manner that the sound or the image of the pattern is synchronized with the continuous rhythm, and
wherein the control processor issues, during the second time frame, the command associated with the pattern matching the series of operation input to a graphics processor so as to display on the display the character operated by the player in a manner of the command.

2. The tangible non-transitory, computer-readable recording medium with game control program product recorded thereon according to claim 1, further comprising a module operative to calculate points to be given to the player in accordance with a determined timing difference between the input rhythm of the operating input and the rhythm of the matching pattern.

3. The tangible non-transitory, computer-readable recording medium with the game control program product recorded thereon according to claim 2, wherein the points are reflected in a parameter for controlling a game which progresses a character operated by the player as a result of the command being issued.

4. The tangible non-transitory, computer-readable recording medium with the game control program product recorded thereon according to claim 1, further comprising a module operative to calculate points to be given to the player in accordance with a number of successful times the player makes a series of operation input matching a pattern among the plurality of patterns.

5. The tangible non-transitory, computer-readable recording medium with the game control program product recorded thereon according to claim 1, wherein the output sound or the output image is repeated in synchronization with the continuous rhythm subsequent to when the series of operation input matching a pattern stored in the command memory unit is acquired.

6. The tangible non-transitory computer readable recording medium with the game control program product embedded thereon according to claim 1, wherein the game control program product is loaded into a processor memory.

7. The tangible non-transitory, computer-readable recording medium with game control program product recorded thereon according to claim 1, wherein the first time frame and the second time frame can be repeated alternately.

8. A game control method, comprising:
outputting a continuous rhythm by means of an indication sound or an indication image to a speaker or a display to be an indication for a player to time an operation input;
acquiring, during a first time frame in which the operation input from the player can be accepted, an input type and an input rhythm of a series of operation input for inputting a command selected by the player from among a plurality of commands for controlling a character operated by the player from the player via an input device;
outputting a sound or an image assigned to the input type of the operation input acquired from the player during the first time frame;
referring to a command memory unit in which a plurality of patterns of type and rhythm of operation input are stored in association with the plurality of commands respectively, and determining whether the series of operation input from the player entered during the first time frame matches a pattern stored in the command memory unit, when the acquired input type and input rhythm of the series of operation input matches, respectively, a type and a rhythm of the pattern;
repeating, if the series of operation input from the player matches a pattern stored in the command memory unit, outputting the sound or the image of the pattern, during a second time frame, after the first time frame, in which the operation input from the player is not accepted, to the speaker or the display in a manner that the sound or the image of the pattern is synchronized with the continuous rhythm; and
issuing, during the second time frame, the command associated with the pattern matching the series of operation input so as to control the character operated by the player.

9. A game device, comprising:
a speaker or display to output a continuous rhythm by means of an indication sound or an indication image as an indication for a player to time an operation input,
a command determination unit operative to acquire, during a first time frame in which the operation input from the player can be accepted, an input type and an input rhythm of a series of operation input for inputting a command selected by the player from among a plurality of commands for controlling a character operated by the player from the player via an input device, and to refer to a command memory unit in which a plurality of patterns of type and rhythm of operation input are stored in association with the plurality of commands respectively, and to determine whether the series of operation input from the player entered during the first time frame matches a pattern stored in the command memory unit, when the acquired input type and input rhythm of the series of operation input matches, respectively, a type and a rhythm of the pattern;
a first sound emitting device or first display device operative to output a sound or an image assigned to the input type of the operation input acquired from the player during the first time frame;
a second sound emitting device or second display device operative to repeat, if the series of operation input from the player matches a pattern stored in the command memory unit, outputting the sound or the image of the pattern, during a second time frame, after the first time frame, in which the operation input from the player is not accepted, to the speaker or the display in a manner that the sound or the image of the pattern is synchronized with the continuous rhythm; and
a game control unit operative to issue, during the second time frame, the command associated with the pattern matching the series of operation input so as to control the character operated by the player.

* * * * *